Aug. 30, 1966 W. C. FARLEY 3,270,185

DATA CONVERSION SYSTEM

Filed March 30, 1962 3 Sheets-Sheet 1

INVENTOR.
WILLIAM C. FARLEY
BY
N. Friedman
ATTORNEY

INVENTOR.
WILLIAM C. FARLEY
BY
N. Friedman
ATTORNEY

INVENTOR.
WILLIAM C. FARLEY
BY
N. Friedman
ATTORNEY 3,270,185
DATA CONVERSION SYSTEM
William C. Farley, Yonkers, N.Y., assignor to Kimball Systems, Inc., a corporation of New York
Filed Mar. 30, 1962, Ser. No. 183,875
4 Claims. (Cl. 235—61.7)

This invention relates to data handling systems. More particularly the invention has to do with converting information recorded on one information storage medium to another information storage medium. In the preferred embodiment of the invention disclosed herein, the first storage medium is a small tag containing information in the form of encoded arrangements of punched holes, and the second storage medium is a larger card on which the information is recorded also in the form of punched holes.

In certain respects, the present invention represents an improvement over the punched tag to punched card converter system disclosed in Jenner U.S. Patent 2,973,142 as modified by pending U.S. patent application Serial Number 751,787, filed July 29, 1958, in the name of Elliott et al. The system disclosed therein comprises a punched tag reading machine coupled to a card punching machine. The nature of this system is such that the infomation read from each tag is punched on a separate card. However, since the tag contains a much smaller number of columns of information than the available columnar capacity of the card, a large portion of the latter's information recording capacity is wasted. Furthermore, when it is desired to convert large numbers of tags to cards, it often is necessary to employ additional ones of this prior art system. That is to say, if in a given application a very large number of tags is to be processed and the available time for doing so is short, it would be necessary for the user to purchase or lease the required number of additional systems, each system comprising both a tag reader and the card punch.

In accordance with the present invention, the foregoing disadvantages and expense are avoided by providing a novel tag to card conversion system in which a plurality of tag readers are adapted to operate in conjunction with a single card punch. The tag readers operate simultaneously and in synchronism with one another. The readers and the card punch mutually control each other's operation in that if any one of the readers is not functioning properly, e.g., if there is an error condition therein, operation of the card punch will be suspended. Conversely, each cycle of operation of the card punch is effective to automatically initiate the next reading cycle of the readers so that the readers will be stopped if the punch stops. The tag information sensed in each of the readers is allocated and transmitted to a different field of the various available punching columns in the card punch. By means of a selective adjustment, the operation of the system can be modified so that less than all of the readers operate in conjunction with the punch.

It is therefore a major object of the invention to provide a novel system for reproducing information from one record medium on another record medium.

It is a further object to provide such a system wherein a plurality of record reading devices transmit information to a single device for reproducing the information on a record member.

It is a further object to provide a tag to card converter system wherein a plurality of tag readers simultaneously transmit information to a card punching machine, and wherein the information from several tags is reproduced on a single punch card.

It is a further object to provide a system of the foregoing type in which selectively the number of tag readers transmitting information to the punch can be varied.

The above and other objects, advantages, and features of the invention will be more clearly understood from the following detailed description when read in conjunction with the accompanying drawings in which.

Figure 5A:
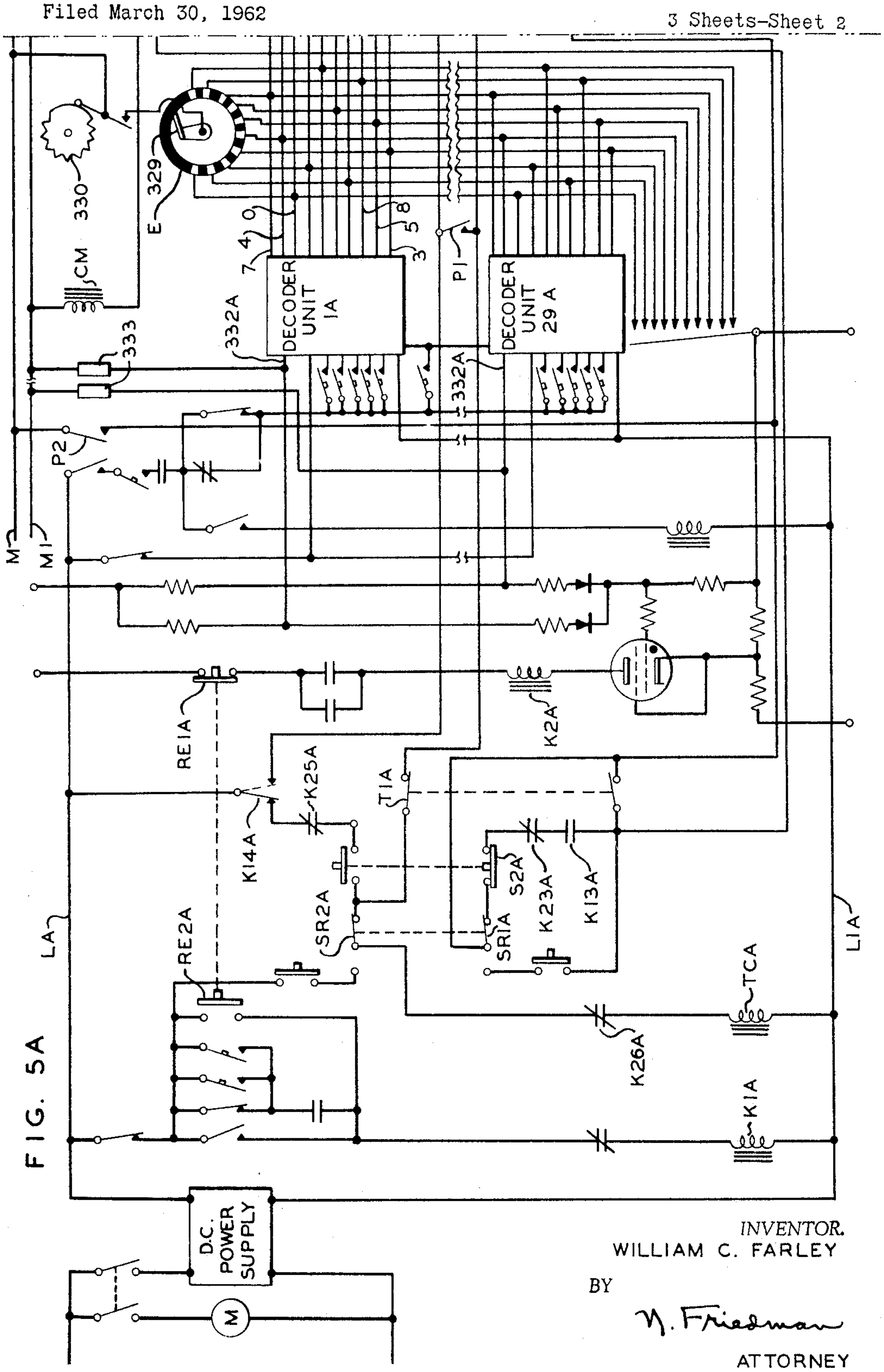
Figure 5B:
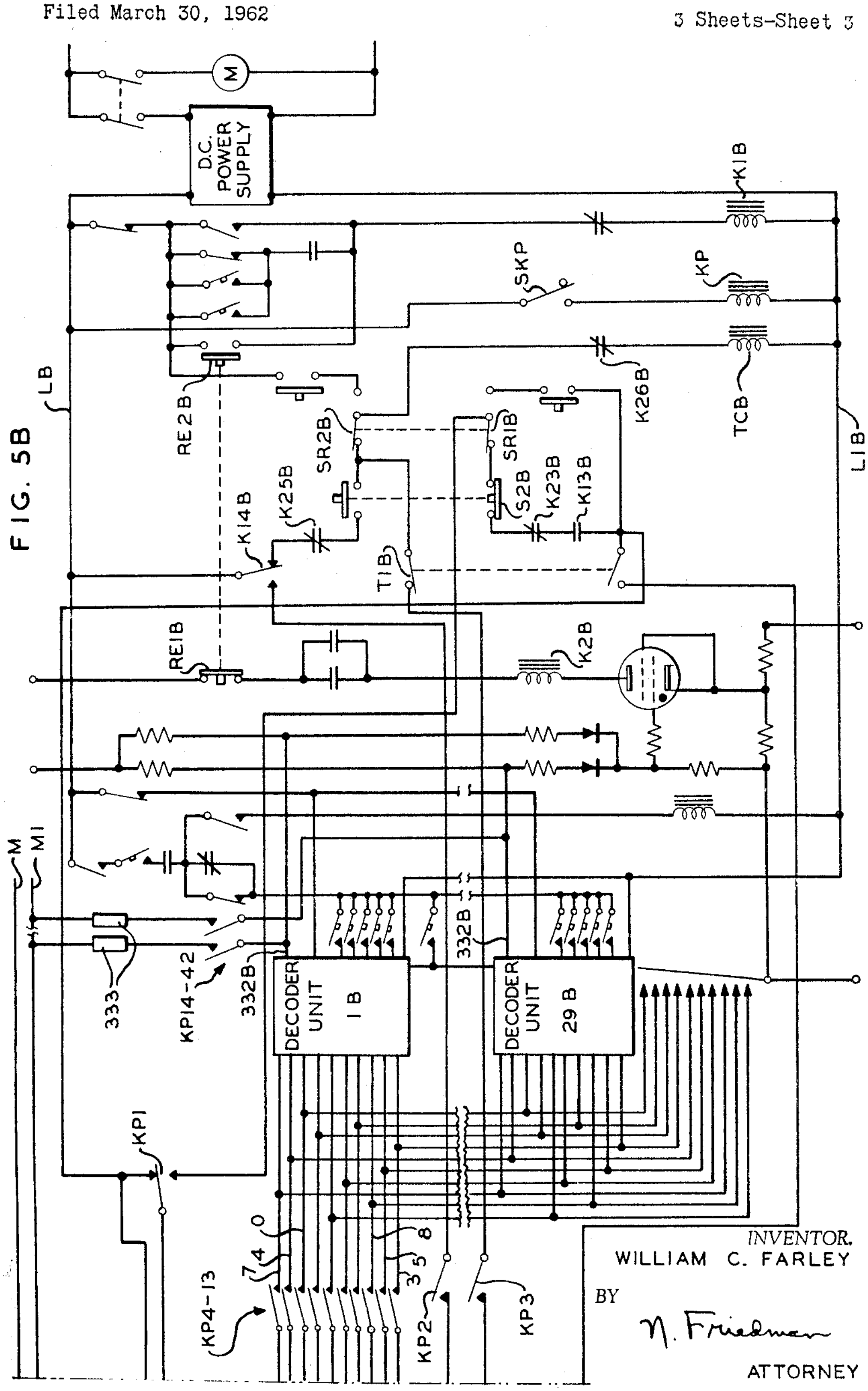

FIGS. 5A and 5B taken together are a schematic wiring diagram of an embodient of the system of the invention.

A specific embodiment of the novel system of the invention will now be described in detail.

Figure 1:
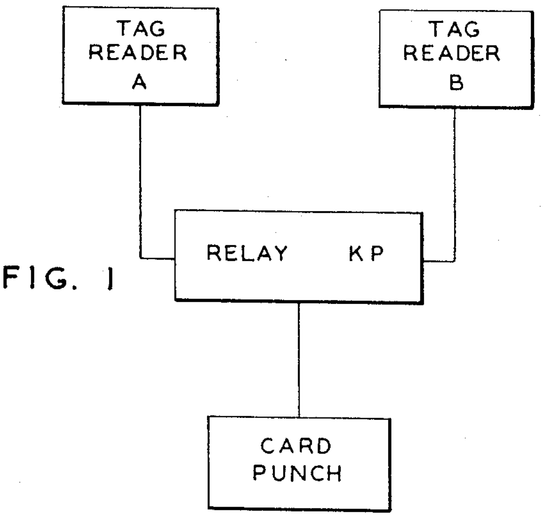
FIG. 1 is a block diagram of the embodiment of the system disclosed herein.

As shown diagrammatically in FIG. 1, the specific embodiment disclosed herein includes two punched tag readers A and B arranged to transmit the information sensed thereby to a single card punching machine. Selectively, under control of a suitably arranged manual switch which controls a relay KP, only reader A operates to transmit to the punch or both readers operate simultaneously to transmit to the punch.

Each reader is constructed substantially as disclosed in U.S. Patent 2,973,142 issued February 28, 1961, to R. K. Jenner, Jr., as modified by U.S. patent application Ser. No. 751,787, filed July 29, 1958, by R. M. Elliott et al.

Jenner and Elliott et al. disclose a system comprising a single tag reader feeding to a card punching machine of the type shown in Lake U.S. Reissue Patent No. 21,133, issued June 27, 1939. The system is such that the information read from each tag is punched on a separate card. However, since the card generally has a much greater number of columns available to receive information than the number of columns of information punched in the tag, the previous single reader system did not represent an efficient usage of the punched card, or of the card punching machine. For example, the punched card employed with the Lake machine usually has 80 columns, whereas the smaller punched tag generally does not contain more than 29 columns of information and in fact may contain a lesser number of columns of punched information.

The plural reader-single punch system of the present invention permits several readers, operating simultaneously to transmit the information read from their respective tags to the card punch where said information is punched on a single card. By virtue of the conventional plug board control of the card punch, the information transmitted by the readers is allotted to different fields of the card. The system of the invention reduces the number of cards used, and saves considerable time.

*Single reader operation*

Figure 2:
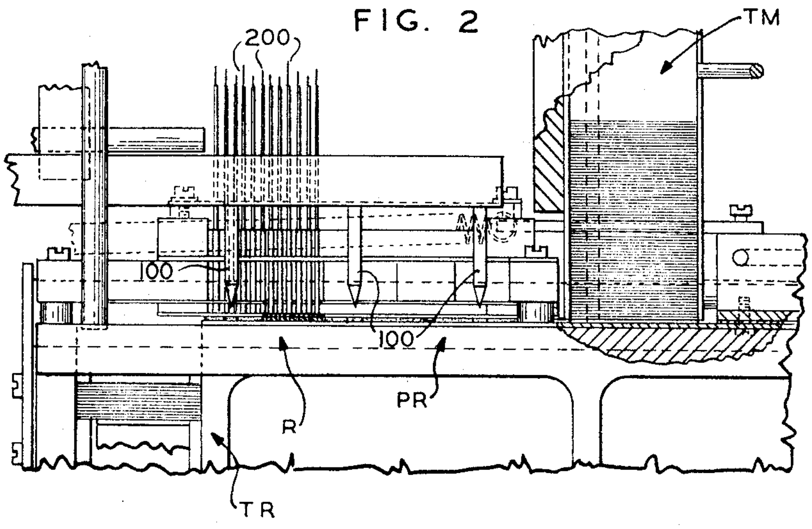
FIG. 2 is a fragmentary front elevational view of one of the two substantially identical tag readers A and B.

A brief review of the operation of the single tag reader to card punch system of Jenner and Elliott et al. will be given at this point. This will be done with reference to the present system when it is operated in single-reader mode, i.e., when only reader A is effective, reader B being disabled. To facilitate the present disclosure, the same reference designations employed in Jenner and Elliott are used herein to denote corresponding elements, with the letter A or B added to denote that the element in question is a part of the corresponding one of the two readers. Referring to FIG. 2, the reader includes a tag magazine TM, a preread station PR, a read station R, and a tag receiver TR. During successive cycles of the reader, its tag feeding mechanism including pins 100 feeds the tags one at a time and in cyclical succession from the magazine TM to an intermediate position, from there to the preread station PR, to the read station R, and then to the tag receiver TR. The control circuitry of the reader A includes a main control relay K1A and an error relay K2A (FIG. 5A).

Figure 3:
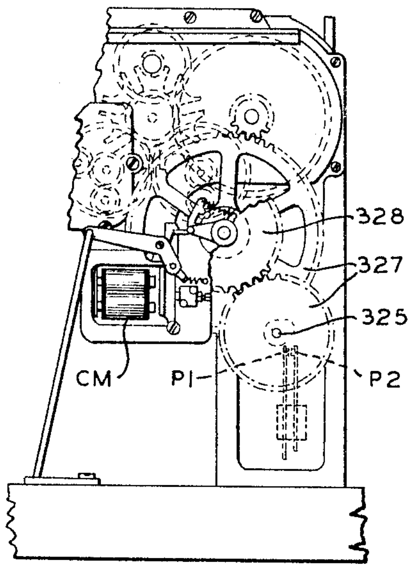
FIG. 3 is an elevational view of a portion of the card punching mechanism.
Figure 4:
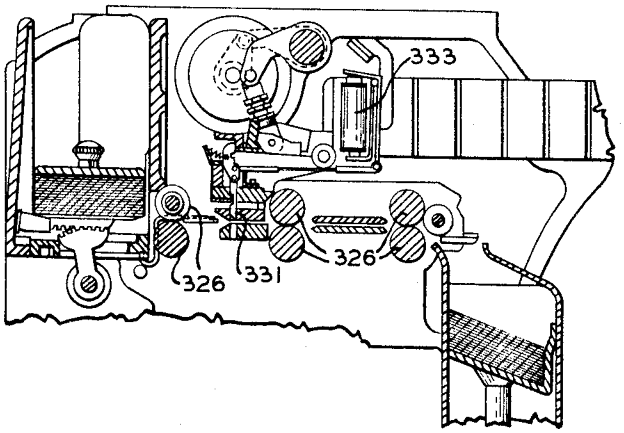
FIG. 4 is another elevational view of the card punching mechanism, showing a different portion thereof.

The card punch utilized for reproducing the data read from the tags into record cards is essentially the punching unit of the high speed reproducer shown in Lake Reissue Patent No. 21,133. As shown in FIGS. 3 and 4, a shaft 325 and gearing 327, 328 are in the driver train of the punch unit. The shaft 325 carries a number of cams which actuate various contacts including contacts P1, P2, and a circuit breaker 330 (FIG. 5A) together with an emitter E.

A punching element 331 is provided for each column of the card processed in the card punching machine. The punches 331 are arranged in a single row across the length of the record card. The latter is fed intermittently thereunder by feed rolls 326. Each punch 331 is actuated by a punch magnet 333 which, when energized, adjusts an interponent in the path of an oscillating bail. In its cycle of oscillation, the bail is effective to drive the enabled interponent to force the related punch 331 through the card.

A single cycle of the tag reader includes the following operations. During a first portion of the cycle, sensing means in the form of sensing wires 200 sense the tag and operate related switches of decoder units 1A–29A (FIG. 5A) to set up a switch pattern for each column of the tag corresponding to the information pattern of encoded holes on the tag. A separate decoder unit is provided for each column of the tag. Next, error detection circuitry of the reader is rendered effective. If no error is found, the relays of the decoding units are locked in by providing a holding circuit, to store the tag information in the decoding units. Near the end of the tag reader cycle, after the sensing wires have been retracted from the tag, the sensed tag is fed by pins 100 from the reading station R to the tag receiver TR and successive tags are fed to the preread and read stations. During this portion of the cycle, the decoded information, which is stored in the latched decoding circuits, controls the card punch to cause the corresponding information to be punched on the card. During the card punching operation, a blank card is fed intermittently row by row by the card punch feed rolls 326 under the punches 331 in timed relation to rotation of brush 329 of the card punching emitter E. The brush is intermittently connected to the line wire M of the card punch power supply lines M, M1 through the circuit breaker 330. The emitter's digital segments are individually connected to the corresponding decimal digit output lines 0–9 of all decoding units 1A–29A. Thus, as the emitter brush 329 makes contact with each segment of the emitter in succession as each row of the card is positioned under the punches, the corresponding digit lines 0–9 of the decoder units are successively closed to the line wire M of the punch. There are separate circuits through each decoder unit from each digital wire 0–9 to wire 332A, the arrangement being such that only one of the wires 0–9 is connected to wire 332A. Of course, the particular one of wires 0–9 which is so connected will depend upon the operated relay pattern of the decoder unit, which will correspond to the encoded hole pattern of the related column of the tag. Each wire 332A leads to an individual punch magnet 333.

Near the end of the cycle of the card punch, its cam switch P1 is closed energizing the tag reader clutch magnet TCA to initiate the next cycle of operation of the reader. Shortly after closure of switch P1, the card punch cam switch P2 closes to energize the card punch clutch magnet CM to enable the card punch for its next cycle of operation before it concludes the current cycle. Early in the next tag reader cycle, and before the new tag at the read station is sensed, the decoding relays of all the decoding units 1A–29A are unlatched. In this manner, all information stored in the decoding units from the previous tag is cleared before the information is sensed from the next tag to be decoded and stored in the decoding units.

The above-described cycles of operation of the reader and the card punch automatically repeat as long as there is a tag at the preread and/or the read station of the reader.

As described in Jenner and Elliott, it is necessary that the main control relay K1A of the tag reader remain continuously energized in order for automatic cycling to continue. The reader includes error detection circuitry which is rendered effective prior to storage of the sensed data in the decoding units. If an error is detected in the punched coding of any column of the tag, the error relay K2A is energized. This will cause the reader's main control relay K14 to become deenergized and thereby prevent closure of the card punch cam switch P1 from energizing the tag reader clutch magnet TCA. In this regard, referring to FIG. 5A, with relays K1A energized and K2A deenergized, closure of the punch cam switch P1 is effective to establish the following energizing circuit for the reader clutch magnet TCA: positive supply line LA, transfer contact K14A of relay K1A (the contact being in its operated, broken-line position) switch P1, switch T1A, switch SR2A, normally closed contact K26A of error relay K2A, reader clutch magnet TCA, and thence to the negative line L1A of the reader D.C. power supply. The purpose of contact K26A, which is a new contact not present in Jenner and Elliott, will be discussed later.

It will be seen that the foregoing circuit will be completed by operation of card punch cam switch P1 only if transfer contact K14A of main control relay K1A is in operated condition. Accordingly, when an error condition is detected in the reader, the consequent deenergization of relay K1A by relay K2A causes contact K14A to transfer to its unoperated (full line) condition whereby operation of switch P1 will be ineffective to energize the reader clutch magnet TCA. Therefore, the reader will merely complete its current cycle of operation and will stop.

The aforementioned operation of the card punch cam switch P2 near the end of the punch cycle will energize the punch clutch magnet CM for the punch's next cycle of operation, in the following fashion. If no error condition exists in the reader, switch P2 when closed will complete the following energizing circuit for magnet CM: line M of the punch power supply, switch P2, reader switch SR1A, reader switch S2A, normally closed contact K23A of error relay K2A, normally open contact K13A of the main control relay K1A (contact K13A being closed because K1A is energized), transfer contact KP of a relay KP (FIG. 5B), punch clutch magnet CM, to the opposite side M1 of the card punch power supply. However, if an error condition exists in the reader, contacts K23A and K13A will both be open, error relay K2A being energized whereby the main control relay K1A is deenergized. Accordingly, closure of the punch cam switch P2 will be ineffective to energize the punch clutch magnet CM, and the card punch will therefore come to a halt.

*Plural reader operation*

The novel system of the invention includes the relay KP (FIGS. 1, 5B). When operated, this relay serves to condition the second reader B for operation in the system together with reader A. When relay KP is denergized, reader B cannot operate, and only reader A will cooperate with the card punch in the manner described previously herein. However, when relay KP is energized both readers A and B can transmit information to the card punch. In this latter, plural-reader mode of operation, both readers control the operation of the punch.

That is, any error condition in either reader will terminate operation of the punch. Conversely, the punch controls both readers in that operation of cam switch P1 of the punch simultaneously energizes clutch magnets TCA and TCB of both readers to initiate joint, synchronous cycling of the latter.

Relay KP is connected across the power supply lines LB, L1B of reader B in series with a bistable, manually operated switch SKP. The control circuitry of reader B is electrically connected in the system through various contacts of relay KP, as follows. The normally open contact point of transfer contact K14B (of main control relay K1B) and switch T1B are connected across cam switch P1 of the card punch, in the same manner as the corresponding points K14A and T1A of reader A. However, the circuit between switch P1, and contact K14B and switch T1B, includes normally open contacts KP2 and KP3 of relay KP.

As mentioned earlier, the various decimal output 0–9 lines of the decoder units 1A–29A of reader A are connected to the corresponding digital segments of emitter E of the card punch. The output lines 0–9 of the decoder units 1B–29B of reader B are in like fashion connected to the same segments of the emitter. However, provided in the ten digit lines running to the emitter from the decoder units of reader B are normally open contacts KP4–KP13 of relay KP. The twenty-nine lines 332B extending from the decoder units 1B–29B of reader B are each connected to a related punch magnet 333 of the card punch in series with a related one of twenty-nine normally open contacts KP14–KP42 of relay KP. It will be understood that the decoder units of readers A and B are connected to different punch magnets 333 of the card punch whereby the information read from tags in the respective readers will be punched in different columns of a card processed in the card punch.

Switches SR1B and T2B of reader B are connected to the normally open and normally closed transfer points, respectively, of transfer contact KP1 of relay KP.

It will be seen from the foregoing description and FIGS. 5A and 5B that so long as relay KP is deenergized, whether intentionally or because of a failure of the power supply of reader B, reader B will be disabled since the various contacts of the relay serve to isolate reader B from the remainder of the system. Reader A, however, can still cooperate with the card punch in the manner previously described.

However, energization of relay KP—in response to turning manual switch SKP on—will condition reader B for operation. Operation of contacts KP2 and KP3 closes the circuits from contact K14B and switch T1B to the card punch cam switch P1. Closure of contacts KP4–13 closes the lines from decoder units 1B–29B to the emitter E. Closure of contacts KP14–42 closes the lines 332B from the decoder units to their related punch magnets 333. Operation of transfer contact KP3 of relay KP modifies the energizing circuit for the punch clutch magnet CM (controlled by cam switch P2 of the card punch) to include not only the various aforedescribed switches and contacts SR1A, S2A, K23A, and K13A of reader A; but also in series therewith the corresponding elements SR1B, S2B, K23B, and K13B of reader B.

Therefore, after readers A and B have both been manually cycled three times to go into automatic cycling with the card punch, their respective main control relays K1A and K1B will remain energized, as described in connection with the single reader system in Jenner and Elliott. When the card punch cam switch P1 operates near the end of the punch cycle, it will simultaneously complete the two, corresponding, parallel energizing circuits for the clutches TCA and TCB of the two readers to initiate operation thereof. These circuits are respectively: for reader A, power supply line LA, contact K14A of main relay K1A, cam switch P1, switch T1A, switch SR2A, normally closed contact K26A of error relay K2A, reader clutch magnet TCA, and power supply line L1A; and for reader B, supply line LB, contact KP2 of relay KP, contact K14B of main relay K1B, cam switch P1, contact KP3 of relay KP, switch T1B, switch SR2B, normally closed contact K26B of error relay K2B, reader clutch magnet TCB, and supply line L1B.

It will be recalled that cam switch P2 of the card punch closes shortly after switch P1, to energize the punch clutch magnet CM for the punch's next cycle of operation. With relay KP energized for plural reader operation, and its contact KP1 therefore transferred, closure of switch P2 completes the following circuit for clutch magnet CM: punch power supply line M, cam switch P2, switch SR1A, switch S2A, normally closed contact K23A (of reader A's error relay K2A), normally open contact K13A (of reader A's main relay K1A), transfer contact KP1 of relay KP (now transferred), switch SR1B, switch S2B, normally closed contact K23B (of reader B's error relay K2B), normally open contact K13B (of reader B's main relay K1B), clutch magnet CM, punch supply line M1.

From the foregoing, it will be seen that if the punch cam switch P1 is not operated, the readers will not cycle. Conversely, if there is an error condition in either reader, the punch will not cycle. For example, as described in detail in Jenner and Elliott an error condition in reader A causes its error relay K2A to be energized, which results in the reader's main relay K1A being deenergized. Energization of error relay K2A opens its normally closed contact K23A. Deenergization of main relay K1A opens its normally open contact K13A. The opening of contacts K23A and K13A prevents closure of the punch cam switch P2 from completing the energizing circuit for the punch clutch magnet CM. In like fashion, an error condition in reader B will open its contacts K23B and K13B to break the energizing circuit for punch clutch magnet CM.

Accordingly, an error condition in either of readers A or B will terminate operation of the card punch at the end of the latter's current cycle. This will prevent further operation of the non-error reader, i.e., the reader in which an error has not been detected even though it still is conditioned for automatic cycling, i.e., with its main relay K1 energized and its error relay K2 deenergized. The fact that the card punch stops prevents further cycling of the non-error reader since, it will be recalled, it is necessary that cam switch P1 of the card punch close in order that a cycle of the readers be initiated.

It is desirable that the error reader immediately terminate operation with the cycle in which the error has been detected. This will occur in the single reader system of Jenner and Elliott since deenergization of relay K1 returns its transfer contact K14 to home position, thereby breaking the only available energizing circuit for the reader clutch magnet TC, even though cam switch P1 of the punch closes once more as the punch completes its current cycle. However, in the present, plural reader system there is a stray energizing circuit available for the clutch magnet TC of the error reader through the circuitry of the non-error reader. This stray circuit is independent of contact K14 of the error reader and unless special provision were made it would cause an extra unwanted cycle of the error reader.

The additional, normally closed contacts K26A, K26B of the respective error relays K2A and K2B are provided in series with clutch magnets TCA and TCB of the respective readers to prevent this extra cycle from occurring. For example, assume a situation where both readers have been operating simultaneously with the card punch, and an error condition occurs in reader A, causing its error relay K2A to operate and thereby deenergize its main relay K1A. This breaks the normal power circuit for the reader clutch magnet TCA through transfer contact K14A of relay K1A and cam switch P1. However, as usual the punch will automatically complete its current cycle of operation which includes closure of cam switch P1. Although this operation of P1 will be ineffective to energize the reader clutch magnet TCA through transfer contact K14A because of the unoperated state of the latter, it will establish an uninterrupted power circuit for clutch magnet TCA through the following portions of the circuit of reader B: contact KP2, transfer contact K14B and thence to supply line LB. It will be understood that contact K14B is in operated condition since the error occurred in reader A, not reader B, whereby relay K1B of the latter remains in its energized, automatic cycling condition. A corresponding stray circuit exists through reader A when an error is detected in reader B. Contacts K26A and K26B of error relays K2A and K2B respectively prevent these stray circuits from energizing the clutch magnet TCA or TCB of the error reader, by opening—and thereby breaking the clutch circuit—in response to energization of the associated error relay.

The card punch will thereupon terminate operation since contacts K13A and K23A of the energizing circuit for the punch clutch magnet are opened, preventing automatic closure of the punch cam switch P2 from energizing magnet CM. Accordingly, at this point the entire system has suspended operation. In accordance with Jenner and Elliott et al., automatic operation is resumed by depression reset switches RE1A, RE2A; and RE1B and RE2B of the two readers.

Although the embodiment described herein involves only two readers, a greater number of readers transmitting simultaneously to a single card punch can be employed in accordance with the principles of the invention. For example, if only twenty columns of information are to be read from each tag and the card processed in the card punch has an eighty column capacity, four readers can be used. Obviously, the only limitation on the number of readers is that the total number of columns of tag information transmitted to the punch cannot exceed the columnar capacity of the card.

When the system includes more than two readers, each additional reader is connected across the card punch cam switch P1 and its decoder units connected to related punch magnets 333 and emitter E respectively of the card punch. Preferably there is provided for each additional reader a separate relay and switch corresponding to relay KP and switch SKP of the present disclosure, connected across the reader power supply lines with the contacts of the relay connected in the circuitry of the reader, as described hereinbefore. Further, the contacts and switches, e.g., K23, K13, SR1, S2, of each additional reader are arranged so that the energizing circuit for the punch clutch magnet CM, said circuit being controlled by cam switch P2, is adapted, in accordance with the same principles as the present two-reader embodiment, to include in series said switches and contacts of the reader so that an error condition in any reader of the system will terminate operation of the card punch.

Also, by suitable modification of the control circuitry the system can be arranged so that occurrence of an error condition in one or more of the readers which are transmitting to the card punch will merely prevent the error reader or readers from transmitting while allowing the nonerror reader(s) to continue functioning with the punch.

Other variations, applications, modifications, refinements, and the like can be made without departing from the spirit and scope of the invention. Accordingly, it is intended that the foregoing discloseure of a specific embodiment of the invention be illustrative only and not limitative of the following claims.

I claim:

1. A data handling apparatus for selectively storing upon a first information medium information read simultaneously from at least a second and a third information medium, comprising: recording means having a plurality of selectable recording elements selectively operable for recording information upon said first information medium; first reading means including a single reading station for reading information contained on said second information medium and producing first outputs capable of selecting certain of said selectable recording elements of said recording means; second reading means including a single reading station for reading information contained on said third information medium and producing second outputs capable of selecting others of said selectable recording elements of said recording means; first coupling means coupling said first and second outputs of said first and second reading means to said selectable recoding elements of said recording means; to permit the selection of said selectable recording elements in accordance with said first and second outputs of said first and second reading means; cyclically operable control means operated by said recording means to selectively operate said selectable recording elements in accordance with the selections made by the simultaneous first and second outputs of said first and second reading means to cause the recording of information upon said first information medium; said first and second reading means each containing an error checking means for checking the accuracy of the outputs of its associated reading means and to produce an error signal in the event the outputs of said first or second reading means is not accurate; and second coupling means to couple the error checking means of said first and second reading means to said recording means to prevent the operation of said recording means and prevent the recording of any information upon said first information medium.

2. A data handling apparatus as defined in claim 1, further including third coupling means coupling each error checking means to its associated reading means to terminate the operation of its associated reading means upon the production of an error signal while permitting the reading means whose associated error checking means does not produce an error signal to complete its reading of its associated record.

3. A data handling apparatus for selectively storing upon a first information medium information read simultaneously from at least a second and a third information medium, comprising: recording means having a plurality of selectable recording elements selectively operable for recording information upon said first information medium; first reading means including a single reading station, a first storage means and a first decoding means, said first reading means reading information contained on said second information medium and producing first outputs capable of selecting certain of said selectable recording elements of said recording means; second reading means including a single reading station, a second storage means and a second docoding means, said second reading means reading information contained on said third information medium and producing second outputs capable of selecting others of said selectable recording elements of said recording means; first coupling means coupling said first and second outputs of said first and second decoding means to said selectable recording elements of said recording means to permit the selection of said selectable recording elements in accordance with said first and second outputs of said first and second recording means; cyclically operable control means operated by said recording means to selectively operate said selectable recording elements in accordance with the selections made by the simultaneous first and second outputs of said first and second decoding means to cause the recording of information upon said first information medium; said first reading means further including first error checking means coupled to said first decoding means for checking the accuracy of said first outputs of said first reading means and to produce a first error signal in the event said first outputs of said first reading means is not accurate; said second reading means further including second error checking means coupled to said second decoding means for checking the accuracy of said second outputs of said second reading means and to produce a second error signal in the event said second outputs of said second reading means is not accurate; and second coupling means coupling said first and second error checking means to said recording means to prevent the operation of said recording means and prevent the recording of any information upon said first information medium.

4. A data handling apparatus as defined in claim 3, further including a third coupling means coupling said first error checking means to said first reading means; and fourth coupling means coupling said second error checking means to said second reading means whereby upon the production of said first error signal said first reading means is caused to terminate its operation while said second reading means is permitted to complete its reading of said second information medium and upon the production of said second error signal said second reading means is caused to terminate its operation while said first reading means is permitted to complete its reading of said third information medium.

References Cited by the Examiner

UNITED STATES PATENTS

| | | | |
|---|---|---|---|
| 3,063,366 | 11/1962 | Foss et al. | 101—93 |
| 3,109,089 | 10/1963 | Reynolds et al. | 235—61.11 |

MAYNARD R. WILBUR, *Primary Examiner.*

MALCOLM A. MORRISON, DARYL W. COOK, *Examiners.*

UNITED STATES PATENT OFFICE

CERTIFICATE OF CORRECTION

Patent No. 3,270,185 August 30, 1966

William C. Farley

It is certified that error appears in the above identified patent and that said Letters Patent are hereby corrected as shown below:

In the heading to the printed specification, line 4, 'a corporation of New York" should read -- a corporation of Delaware --. Column 4, line 19, "K14" should read -- K1A --. Column 7, line 25, "depression" should read -- depressing --. Column 8, line 12, "recoding" should read -- recording --.

Signed and sealed this 9th day of June 1970.

(SEAL)
Attest:

Edward M. Fletcher, Jr.
Attesting Officer

WILLIAM E. SCHUYLER, JR.
Commissioner of Patents